(12) United States Patent
Kunitachi

(10) Patent No.: US 8,733,979 B2
(45) Date of Patent: May 27, 2014

(54) DISPLAY DEVICE

(75) Inventor: Ryo Kunitachi, Kariya (JP)

(73) Assignee: Denso Corporation, Kariya (JP)

( * ) Notice: Subject to any disclaimer, the term of this patent is extended or adjusted under 35 U.S.C. 154(b) by 193 days.

(21) Appl. No.: 13/357,012

(22) Filed: Jan. 24, 2012

(65) Prior Publication Data

US 2012/0188770 A1 Jul. 26, 2012

(30) Foreign Application Priority Data

Jan. 25, 2011 (JP) .................................. 2011-13213

(51) Int. Cl.
*F21V 9/10* (2006.01)
*F21V 9/08* (2006.01)

(52) U.S. Cl.
USPC ..................... 362/293; 362/23.01; 362/23.07; 362/23.09; 362/311.06

(58) Field of Classification Search
USPC ........ 362/23–30, 293, 311.01–311.15, 23.01, 362/23.07, 23.09, 23.16, 23.19, 23.2
See application file for complete search history.

(56) References Cited

U.S. PATENT DOCUMENTS

| | | | |
|---|---|---|---|
| 6,422,710 B1 * | 7/2002 | Herzog et al. .................. | 362/23 |
| 2009/0103278 A1 * | 4/2009 | Miyashita ....................... | 362/29 |

FOREIGN PATENT DOCUMENTS

| | | | |
|---|---|---|---|
| JP | 2005-98758 | | 4/2005 |
| JP | 2005098758 A | * | 4/2005 |
| JP | 2006-194636 | | 7/2006 |
| JP | 2006194636 A | * | 7/2006 |
| JP | 2007-003304 | | 1/2007 |
| JP | 2008-215883 | | 9/2008 |

OTHER PUBLICATIONS

Office Action issued Dec. 18, 2012 in corresponding Japanese Application No. 2011-13213 with English translation.

* cited by examiner

*Primary Examiner* — Karabi Guharay
*Assistant Examiner* — Nathaniel Lee
(74) *Attorney, Agent, or Firm* — Harness, Dickey & Pierce, PLC

(57) ABSTRACT

A display device includes a light source, a first light emitting portion, a second light emitting portion, a light modulating portion and a light focusing portion. The first light emitting portion is disposed in a display area and emits a light that is provided by the light source and has a first luminous state. The second light emitting portion is disposed adjacent to the first light emitting portion in the display area and emits a light that is provided by the light source and has a second luminous state different from the first luminous state. The light modulating portion modulates a state of the light emitted from the light source into the first luminous state. The light focusing portion focuses the light modulated by the light modulating portion on the first light emitting portion.

7 Claims, 5 Drawing Sheets

DISPLAY DEVICE

CROSS REFERENCE TO RELATED APPLICATION

This application is based on Japanese Patent Application No. 2011-13213 filed on Jan. 25, 2011, the disclosure of which is incorporated herein by reference.

FIELD OF THE INVENTION

The present invention relates to a display device having multiple light emitting portions in an information display area.

BACKGROUND OF THE INVENTION

In a s display device, it has been known to provide multiple light emitting portions having different light emitting states in a display area. For example, JP2007-3304A describes a pointer instrument as an example of such a display device. The described pointer instrument has a scale as one of the light emitting portions and a character as another one of the light emitting portion. The scale and the letter are disposed next to each other in the display area.

The described pointer instrument has light emitting diodes to apply light to the light emitting portions. The light generated from the light emitting diodes reaches the scale by being reflected through a convex-concave layer formed on a translucent member. In the convex-concave layer, the light emitted from the light emitting diode is modulated to a predetermined brightness as a luminous state of the convex portion. As such, the scale and the character emit light with different brightness.

In such a pointer instrument, generally, a line of sight of a user directing to the light emitting portions such as the scale and the character varies due to a disparity between a right eye and a left eye of the user and/or a movement of user's head or user's upper body.

Therefore, in a structure where the light emitting portions having different light emitting states are disposed adjacent to each other, the light modulated to the predetermined brightness by the convex portion as the light emitting state of the scale will reach the character. As a result, it is viewed that the light emitted from the character is mixed with the light emitted from the scale. Thus, the light modulated to have a high brightness by the convex-concave layer affects the light emitted from the letter.

It may be possible to reduce the region of the convex-concave layer so as to reduce the affect to the light emitted from the letter. However, it is difficult to emit the light from the scale with the predetermined brightness. In this way, if the light emitting portions are located adjacent to each other in the information display area, the light emitting state of one of the light emitting portions is likely to be affected.

SUMMARY OF THE INVENTION

According to an aspect, a display device includes a light source, a first light emitting portion, a second light emitting portion, a light modulating portion and a light focusing portion. The light source generates light. The first light emitting portion is disposed in a display area and emits light that is provided by the light source and has a first luminous state. The second light emitting portion is disposed next to the first light emitting portion in the display area and emits light that is provided by the light source and has a second luminous state. The light modulating portion modulates a state of light generated from the light source into the first luminous state. The light focusing portion focuses the light modulated by the light modulating portion on the first light emitting portion, so that the light in the first luminous state is emitted from the first light emitting portion.

In such a structure, the modulated light is focused on the first light emitting portion by the light focusing portion. Therefore, even if a user's eye direction is changed, it is less likely that the modulated light will be mixed with the light to be emitted from the second light emitting portion. As such, it is less likely that the second luminous state of the light emitted from the second light emitting portion will be affected by the modulated light. In addition, the light emitted from the first light emitting portion in the first luminous state is provided by the modulated light focused by the light focusing portion. Therefore, even if the first light emitting portion and the second light emitting portion are disposed adjacent to each other in the display area, the first light emitting portion and the second light emitting portion emit lights in desired luminous states, respectively.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

Hereinafter, exemplary embodiments will be described with reference to the drawings. Like parts are designated with like reference numbers throughout the exemplary embodiments, and a description thereof will not be repeated.

First Embodiment

Figure 1:
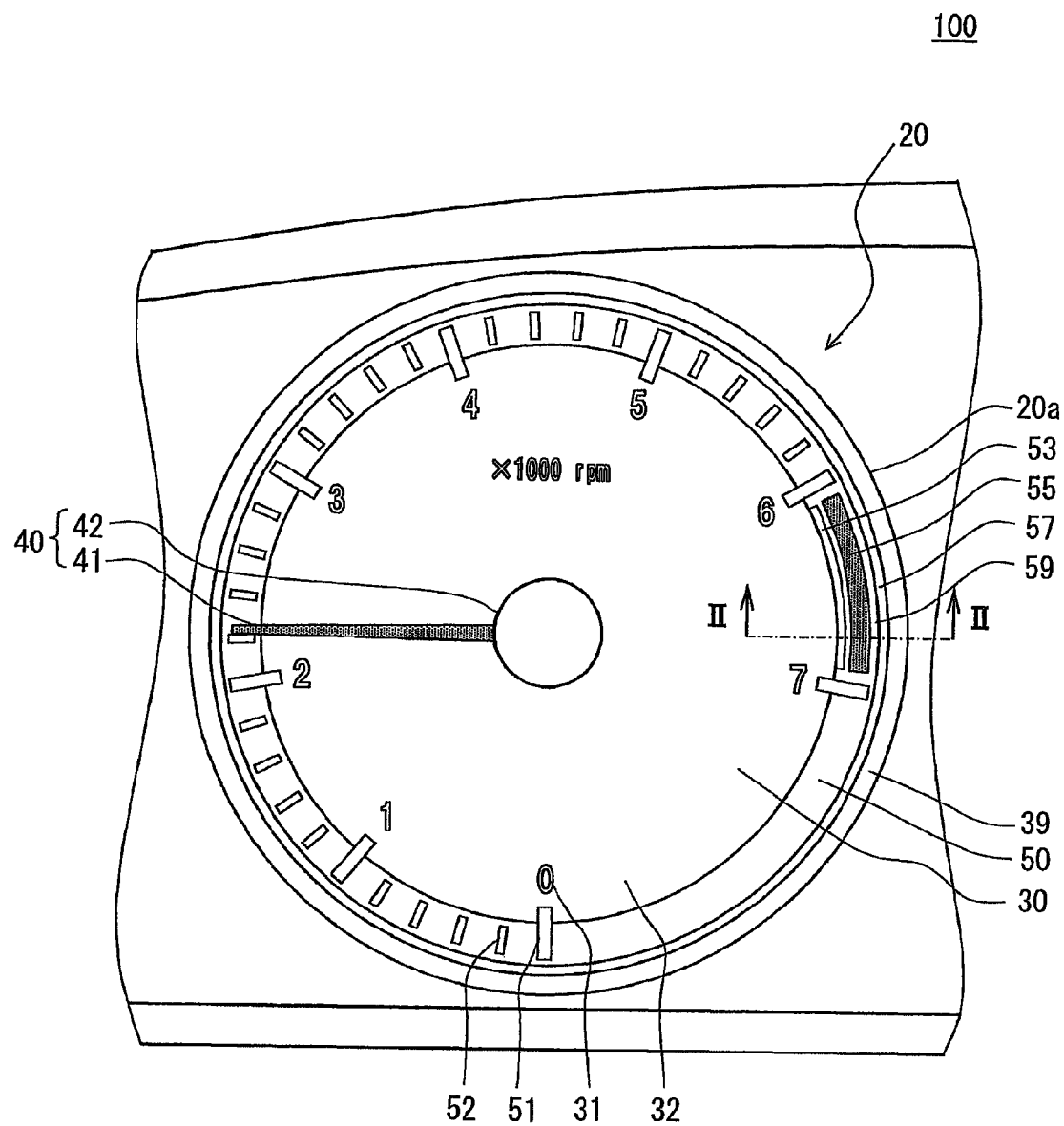
FIG. 1 is a front view of a combination meter according to a first embodiment.

FIG. 1 is a front view of a combination meter 100 as an example of a display device according to a first embodiment. The combination meter 100 is disposed in an instrument panel of a vehicle. The combination meter 100 is arranged such that a front side shown in FIG. 1 faces a user, for example, faces a driver's seat.

First, a basic structure of the combination meter 100 will be described.

The combination meter 100 is a display device that displays various information regarding a vehicle. As shown in FIG. 1, the combination meter 100 includes a tachometer 20 that displays a rotational speed of an output shaft of an internal combustion engine as one of the information. Although not illustrated, the combination meter 10 includes other meters such as a speedometer, a water temperature gauge and a fuel gauge.

The tachometer 20 includes a display panel 30, a pointer 40, an outer edge ring 39, and a solid scale ring 50 in a display area 20a where the information is displayed. The display of the tachometer 20 is provided by the pointer 40, a character portion 31 formed on the display panel 30, light emitting portions formed in the solid scale ring 50 and the like.

The display panel 30 has a disc shape. The character portion 31 emits light in a display direction toward the driver's seat. For example, the display direction corresponds to an upward direction in FIG. 2. The character portion 31 includes characters, such as "0" to "7". The characters are arranged at equal intervals in a circumferential direction of a dial board.

The pointer 40 rotates along a front surface of the display panel 30, the front surface facing the driver's seat. The pointer 40 includes a cap portion 42 and a needle portion 41. The cap portion 42 has a disc shape. The cap portion 42 is located at a center of the display panel 30.

The needle portion 41 extends from the cap portion 42 in a radial direction of the display panel 30. The needle portion 41 has a predetermined length so that an end of the needle portion 41 can overlap the light emitting portions formed on the solid scale ring 50 with respect to the display direction. The needle portion 41 is illuminated by emitting light.

The outer edge ring 39 has a ring shape. The outer edge ring 39 entirely surrounds an outer end of the solid scale ring 50 in a circumferential direction. In the combination meter 100, the display area 20a of the tachometer 20 is defined by the outer edge ring 39.

The solid scale ring 50 has a ring shape. The solid scale ring 50 surrounds an outer periphery of the character portion 31 formed on the display panel 30 entirely in a circumferential direction. The solid scale ring 50 has a main scale portion 51, a sub scale portion 52, a white belt portion 53, a red belt portion 55 and a ring-shaped light emitting portion 57 as the multiple light emitting portions.

The main scale portion 51 and the sub scale portion 52 include marks for indicating the value in cooperation with the character portion 31 as being pointed by the end of the pointer 40 that rotates in accordance with the rotational speed of the internal combustion engine. The marks of the main scale portion 51 are arranged at equal intervals along a ring-shaped outer edge of the display panel 30.

The marks of the main scale portion 51 are disposed radially outside of the characters of the character portion 31. Each of the marks of the main scale portion 51 has a rectangular shape. The rectangular mark of the main scale portion 51 extends in a radial direction of the solid scale ring 50.

The marks of the sub scale portion 52 are arranged along the ring-shaped outer edge of the display panel 30 in regions each provided between the adjacent marks of the main scale portion 51.

It is to be noted that the marks of the sub scale portion 52 are not formed in a region between the mark of the main scale portion 51 corresponding to the character "6" and the mark of the main scale portion 51 corresponding to the character "7".

The marks of the sub scale portion 52 are arranged at equal intervals. Further, an interval between the mark of the main scale portion 51 and the mark of the sub scale portion 52 adjacent to the mark of the main scale portion 51 is equal to an interval between the adjacent two marks of the sub scale portion 52.

Each of the marks of the sub scale portion 52 has a rectangular shape smaller than the mark of the main scale portion 51. The mark of the sub scale portion 52 extends in the radial direction of the solid scale ring 50.

The white belt portion 53 and the red belt portion 55 are formed in the solid scale ring 50 in the region between the mark of the main scale portion 51 corresponding to the character "6" and the mark of the main scale portion 51 corresponding to the character "7". The while belt portion 53 and the red belt portion 55 extend in the circumferential direction of the solid scale ring 50.

The white belt portion 53 is located on an inner side of the red belt portion 55 with respect to the radial direction. The white belt portion 53 emits a white light. That is, the white belt portion 53 is illuminated in a white color.

The red belt portion 55 is located on an outer side of the white belt portion 53 with respect to the radial direction. The red belt portion 55 emits a red light.

The white belt portion 53 and the red belt portion 55 indicate a red zone, which is a limit zone of the rotational speed of the output shaft of the internal combustion engine, in cooperation with each other.

The ring-shaped light emitting portion 57 provides an ornamental portion that entirely surrounds the outer periphery of the marks of the main and sub scale portions 51, 52, the white belt portion 53 and the red belt portion 55. The ring-shaped light emitting portion 57 is located on an inner side of the outer edge ring 39 with respect to the radial direction.

The ring-shaped light emitting portion 57 emits a white light. The red belt portion 55, and the white belt portion 53 and ring-shaped light emitting portion 57 have different light emitting states. As an example of the different light emitting states, the color of the light emitted from the red belt portion 55 and the color of the light emitted from the white belt portion 53 and ring-shaped light emitting portion 57 are different.

Figure 2:
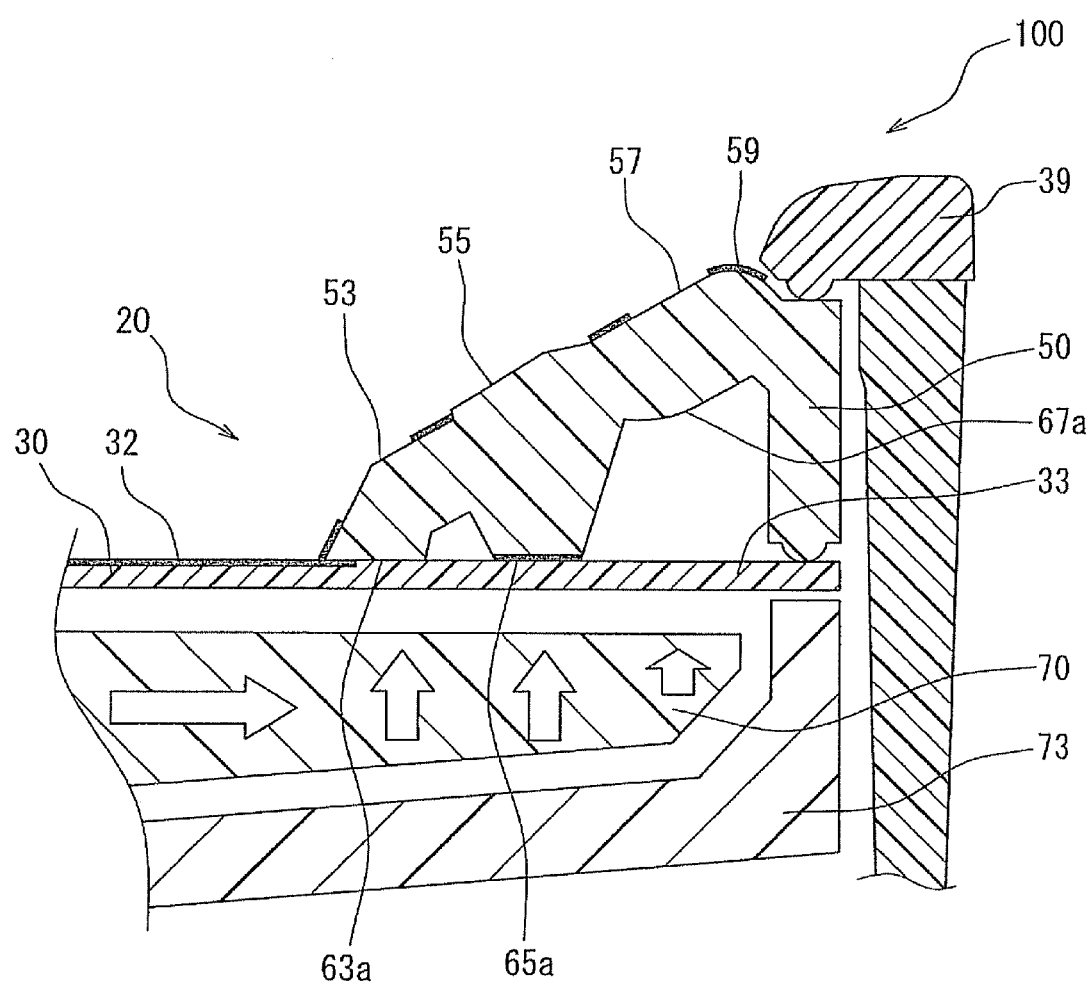
FIG. 2 is a cross-sectional view taken along a line II-II in FIG. 1.
Figure 3:
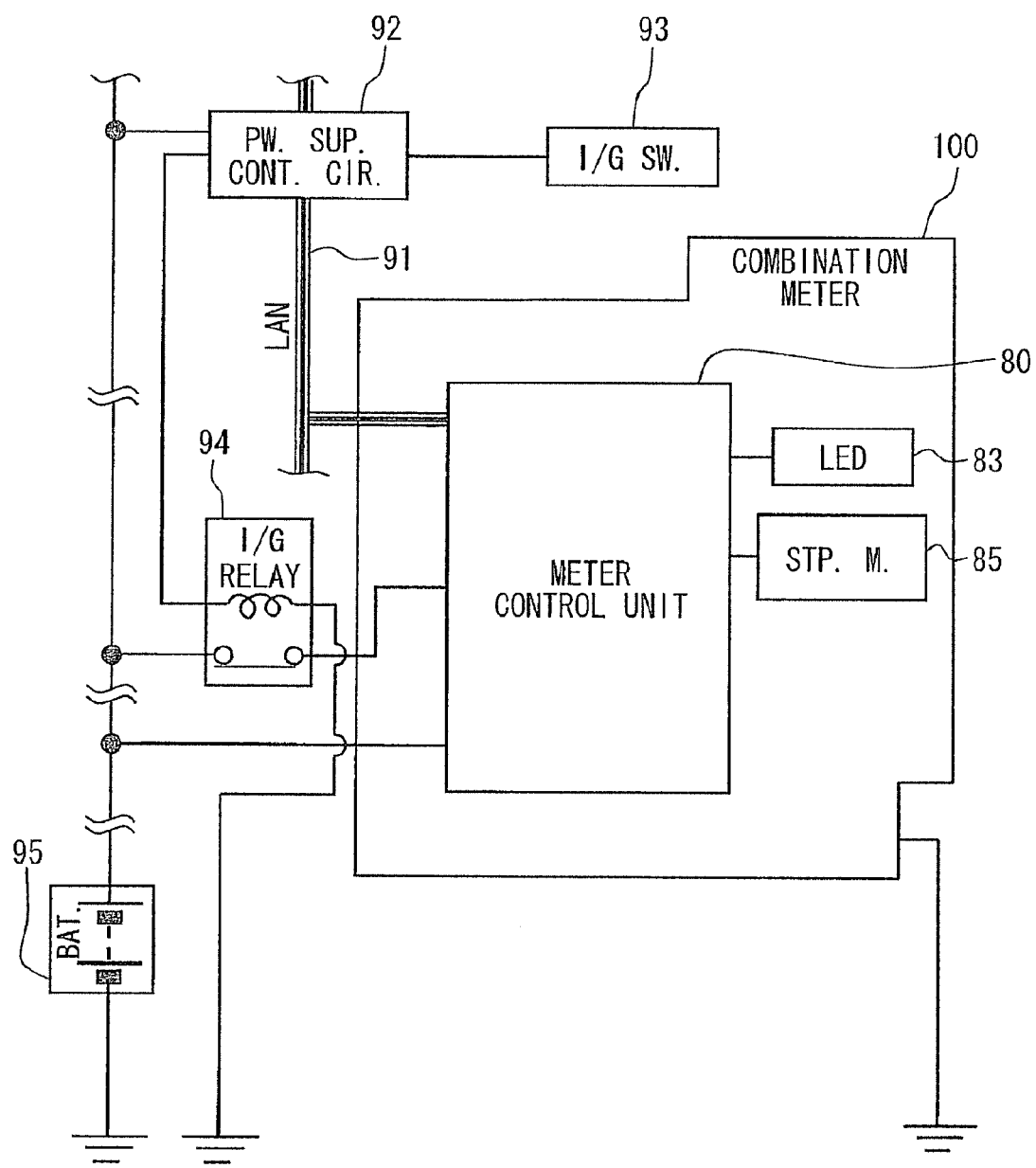
FIG. 3 is a block diagram illustrating an electric structure of the combination meter according to the first embodiment.

Next, a mechanical structure and an electric structure of the combination meter 100 will be described with reference to FIGS. 1 through 3.

The combination meter 100 includes a light conduction member 70, a cover member 73, a light emitting diode 83, a stepper motor 85 and a meter control unit 80, in addition to the display panel 30, the pointer 40, the outer edge ring 39, and the solid scale ring 50 as described above.

The combination meter 100 is constructed by encasing the component parts in a housing (not shown) that is provided by assembling multiple case members, a transparent front panel and the like to each other. Thus, the combination meter 100 is protected from foreign materials, such as dust.

The display panel 30 is made of a translucent resin material, such as an acrylic resin or a polycarbonate resin, which allows light to transmit. The display panel 30 includes a light shielding portion 32 and a light transmitting portion 33.

The light shielding portion 32 is formed by printing a light shielding material on a base material of the display panel 30. The light shielding portion 32 is formed in an area other than the characters of the character portion 31. Therefore, the characters of the character portion 31 are illuminated by transmitting light. The light transmitting portion 33 is disposed on an outer side of the light shielding portion 32 with respect to the radial direction.

The light transmitting portion 33 allows the light to transmit. The light transmitting portion 33 is disposed between the light conduction member 70 and the solid scale ring 50. The light emitted from the light conduction member 70 passes through the light transmitting portion 33, and enters the solid scale ring 50.

The cap portion 42 is made of a resin material that does not transmit light. The needle portion 41 is made of a resin material that allows light to transmit and is colored in red. The light emitted from the light emitting diode 83 enters the needle portion 41 from an end that is hidden by the cap portion 42. The light entering the needle portion 41 is emitted from the portion exposed on the display panel 30. Thus, the needle portion 41 is illuminated.

The outer edge ring 39 is made of a resin material that does not transmit light. A portion of the outer edge ring 39, which can be viewed from a user, is coated with paint. The outer edge ring 39 holds the solid scale ring 50 and the display panel 30 with the cover member 73 when being fixed to the casing of the combination member 100.

The solid scale ring 50 is made of a material that transmits light. A light shielding portion 59 is formed on the surface of the solid scale ring 50. The light shielding portion 59 is formed by printing a light shielding material, similar to the light shielding portion 32 of the display panel 30. The multiple light emitting portions such as the main scale portion 51 and the sub scale portion 52 are divided from each other by the light shielding portion 59.

The solid scale ring 50 has a white light incidence surface 63, a red light incidence surface 65a, and a ring-shaped incidence surface 67a. The white light incidence surface 63a is located on a side opposite to the white belt portion 53 in the solid scale ring 50 with respect to the display direction. The white light incidence surface 63a allows the light to be emitted from the white belt portion 53 to enter the solid scale ring 50.

The red light incidence surface 65a is located on a side opposite to the red belt portion 55 in the solid scale ring 50 with respect to the display direction. The red light incidence surface 65a allows the light to be emitted from the red belt portion 55 to enter the solid scale ring 50.

The ring-shaped incidence surface 67a has a ring shape and is located on a side opposite to the ring-shaped light emitting portion 57 in the solid scale ring 50 with respect to the display direction. The ring-shaped incidence surface 67a allows the light to be emitted from the ring-shaped light emitting portion 57 to enter the solid scale ring 50.

The solid scale ring 50 is located on the front side of the display panel 30. The solid scale ring 50 is held between the display panel 30 and the outer edge ring 39. The front surface of the solid scale ring 50 on which the multiple light emitting portions are formed is inclined radially outward with respect to the display direction. Because of such a shape of the solid scale ring 50, the main scale portion 51 and the sub scale portion 52, which extend in the radial direction, provides a solid appearance in the display of the combination meter 100.

The light conduction member 70 has a disc shape. The light conduction member 70 is made of a material that transmits light. The light conduction member 70 is disposed behind of the display panel 30 with respect to the display direction. That is, the light conduction member 70 is disposed opposite to the solid scale ring 50 with respect to the display panel 30.

The light conduction member 70 allows the light emitted from the light emitting diode 83 to enter therein, and conducts the light in the radially outward direction. The light conducted in the light conduction member 70 is emitted in the display direction from the area corresponding to the character portion 31 of the display panel 30 and the area overlapping with each of the light emitting portion of the solid scale ring 50 with respect to the display direction.

In this way, the light conduction member 70 conducts the light from the light emitting diode 83 to the character portion 31 and the light emitting portions, which emit the light in the display area 20a.

The cover member 73 is made of a resin material that is white and does not transmit light. The cover member 73 is fixed to the housing of the combination meter 100. The cover member 73 covers the back side of the light conduction member 70 so as to restrict leakage of the light from the light conduction member 70 to the back side, which is opposite to the display direction.

The light emitting diode 83 is a light emitting element that generates light to be emitted from the needle portion 41, the character portion 31 and the light emitting portions of the solid scale ring 50 as being applied with a voltage. In the present embodiment, multiple light emitting diodes 83 are mounted on a circuit board (not shown) of the combination meter 100.

The light emitting diodes 83 are disposed adjacent to the light conduction member 70 to enter the light into the light conduction member 70. The light emitting diodes 83 emit a white light, for example. The light emitting diodes 83 are connected to the meter control unit 80. The light emitting diodes 83 emit light when being applied with the voltage from the meter control unit 80.

The stepper motor 85 is a device that rotates the pointer 40. The stepper motor 85 is connected to the meter control unit 80. The cap portion 42 of the pointer 40 is fixed to a rotation shaft of the stepper motor 85. The stepper motor 85 rotates the pointer 40 in accordance with a control signal outputted from the meter control unit 80.

The meter control unit 80 is provided by a microcomputer that is operated based on a program. The meter control unit 80 is connected to an external battery 95, an ignition relay 94, an in-vehicle local area network (in-vehicle LAN) 91 and the like. The meter control, unit 80 is supplied with electric power from the battery 95.

A power supply control circuit 92 is provided on the in-vehicle LAN 91. The power supply control circuit 92 detects whether an ignition switch 93 is operated by a user, and applies the voltage to the ignition relay 94 to set the ignition relay 94 in an electrically conducted state.

The power supply control circuit 92 provides information regarding an on and off state of the vehicular ignition to the in-vehicle LAN 91 based on the detected user's operation of the ignition switch. The meter control unit 80 acquires various information regarding the vehicle, such as the engine rotational speed and the on and off state of the ignition switch 93, from the in-vehicle LAN 91.

The meter control unit 80 controls the operation of the light emitting diodes 83 and the rotation of the stepper motor 85. The meter control unit 80 applies the voltage to the light emitting diodes 83 to cause the light emitting diodes 83 to generate light. The meter control unit 80 calculates a direction to rotate the pointer 40 and a rotational angle of the pointer 40 based on the information regarding the engine rotational speed acquired through the in-vehicle LAN 91. The meter control unit 80 provides a control signal according to the calculated result to the stepper motor 85. Thus, the pointer 40 is rotated by the stepper motor 85.

In the above described combination meter 100, the pointer 40 begins to rotate, and the needle 41, the character portion 31, the main scale portion 51, the sub scale portion 52 and the like begin emit light, based on the user's operation to the ignition switch 93. As such, the engine rotational speed is displayed in the tachometer 20.

Next, a characterizing portion of the combination meter 100 of the present embodiment will be described in detail with reference to FIGS. 4A and 4B.

The solid scale ring 50 has a red printed portion 66, a white light focusing portion 63, a red light focusing portion 65 and a ring-shaped light focusing portion 67. The red printed portion 66 is formed on the red light incidence surface 65a to be integral with the red light focusing portion 65. The red printed portion 66 modulates the state of light emitted from the light emitting diodes 83 to a predetermined state as a luminous state of the red belt portion 55.

Specifically, the red printed portion 66 mainly transmits rays of light in a wavelength range of red. Thus, the red printed color portion 66 modulates the color of the light emitted from the light emitting diodes 83 to a predetermined red color as a luminous color of the red belt portion 55.

The white light focusing portion 63 is disposed opposite to the white belt portion 53 in the solid scale ring 50 with respect to the display direction. The white light focusing portion 63 has a reflection surface 63b so as to conduct the white light to the white belt portion 53, in addition to the white light incidence surface 63a.

The white light incidence surface 63a is a plane surface and is disposed along the front surface of the display panel 30. Further, the white light incidence surface 63a is in contact with the light transmitting portion 33 of the display panel 30 on the radially inner side of the red printed portion 66.

In the light emitting portion 33, a portion that is in contact with the white light incidence surface 63a and allows a bypassing light bypassing the red printed portion 66 to enter the white light incidence surface 63a is referred to as a belt-shaped light emitting portion 33a.

The reflection surface 63b is inclined radially outward with respect to the display direction. The reflection surface 63b extends in the circumferential direction of the solid scale ring 50.

As such, the bypassing light that passes through the belt-shaped light transmitting portion 33a and kept in the white color enters the white light focusing portion 63 through the white light incidence surface 63a. In the white light focusing portion 63, the bypassing light is reflected toward the white belt portion 53. Thus, the bypassing light is focused on the white belt portion 53.

The red light focusing portion 65 is disposed opposite to the red belt portion 55 in the solid scale ring 50 with respect to the display direction. The red light focusing portion 65 projects from the solid scale ring 50 towards the display panel 30, that is, in a direction opposite to the display direction. The red light focusing portion 65 has a pair of reflection surfaces 65b so as to conduct the modulated red light to the red belt portion 55 in addition to the red light incidence surface 65a.

The red light incidence surface 65a is disposed at an end of the red light focusing portion 65 adjacent to the display panel 30. The red light incidence surface 65a is a plane surface extending along the front surface of the display panel 30. The red light incidence surface 65a is in contact with the light transmitting portion 33 of the display panel 30.

The reflection surfaces 65b are opposed to each other with respect to the radial direction of the solid scale ring 50. Each of the reflection surfaces 65b extends in the circumferential direction of the solid scale ring 50. An inner reflection surface 65b, which is one of the reflection surfaces 65b and located on a radially inner side of the other, is inclined radially inward with respect to the display direction. An outer reflection surface 65b, which is the other of the reflection surfaces 65b and located on a radially outer side of the inner reflection surface 65b, is inclined radially outward with respect to the display direction.

The modulated red light, which has been modulated into the red color through the red printed portion 66, enters the red light focusing portion 65 from the red light incidence surface 65a. In the red light focusing portion 65, the modulated red light is reflected on the reflection surfaces 65b toward the red belt portion 55. Thus, the modulated red light is focused on the red belt portion 55.

The ring-shaped light focusing portion 67 has a ring shape, and is disposed opposite to the ring-shaped light emitting portion 57 in the solid scale ring 50 with respect to the display direction. The ring-shaped light focusing portion 67 has the ring-shaped incidence surface 67a so as to conduct the white light to the ring-shaped light emitting portion 57.

The ring-shaped incidence surface 67a is curved to be convex toward the display panel 30. An optical axis of the ring-shaped incidence surface 67a, which is formed into a convex lens shape, is inclined radially inward with respect to the display direction. Therefore, the ring-shaped incidence surface 67a can refract a line of sight of the user toward a location away from the red printed portion 66 in a radially outward direction.

In the light transmitting portion 33, a portion that allows the bypassing light bypassing the red printed portion 66 to enter the ring-shaped incidence surface 67a is referred to as a ring-shaped light transmitting portion 33b. The ring-shaped light transmitting portion 33b could be located away from the red printed portion 66 due to the refraction effect of the ring-shaped incidence surface 67a. As such, the bypassing light that passes through the ring-shaped light transmitting portion 33b and has the white color enters the ring-shaped light focusing portion 67 through the ring-shaped incidence surface 67a.

In the ring-shaped light focusing portion 67, the bypassing light is refracted toward the ring-shaped light emitting portion 57 due to the ring-shaped incidence surface 67a having the convex lens shape. Thus, the bypassing light is focused on the ring-shaped light emitting portion 57.

The light-focusing effects of the white light focusing portion 63, the red light focusing portion 65 and the ring-shaped light focusing portion 67 will be described further in detail.

Figure 4A:
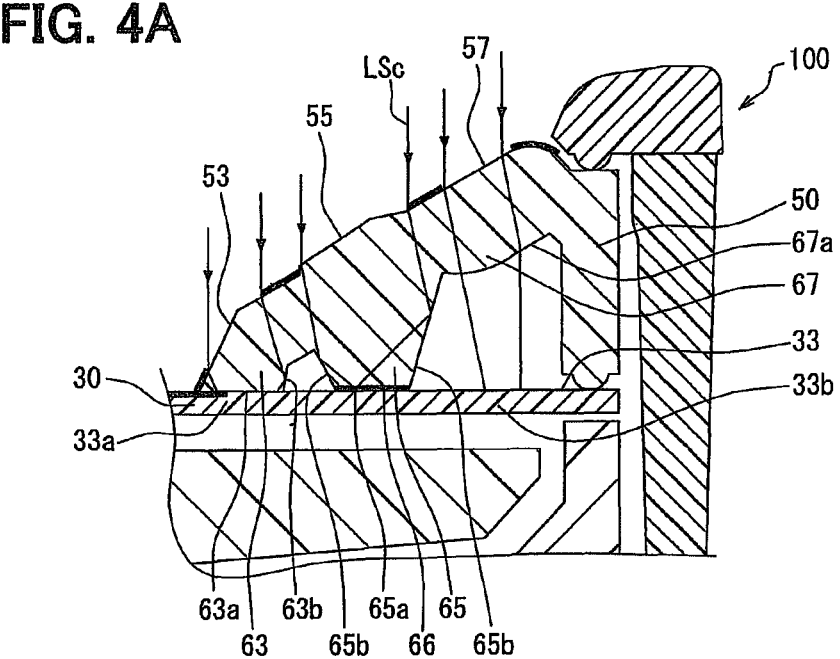
FIG. 4A is an enlarged cross-sectional view for explaining a structure of a solid scale ring of the combination member according to the first embodiment.

In FIG. 4A, solid lines LSc denote the line of sight of the user when the eyes of the user are at the front of the combination meter 100. In this case, the line of sight LSc is parallel to the display direction of the combination meter 100.

The eyes of the user are moved to a left side or a right side from the line of sight shown in FIG. 4A, when the user changes his/her head position. That is, the line of sight will be changed depending on the user's position. FIG. 4B illustrates the maximum angle of the line of sight relative to the display direction when the user's eyes are moved within a predetermined (assumed) range, such as when the user moves his/her head.

Figure 4B:
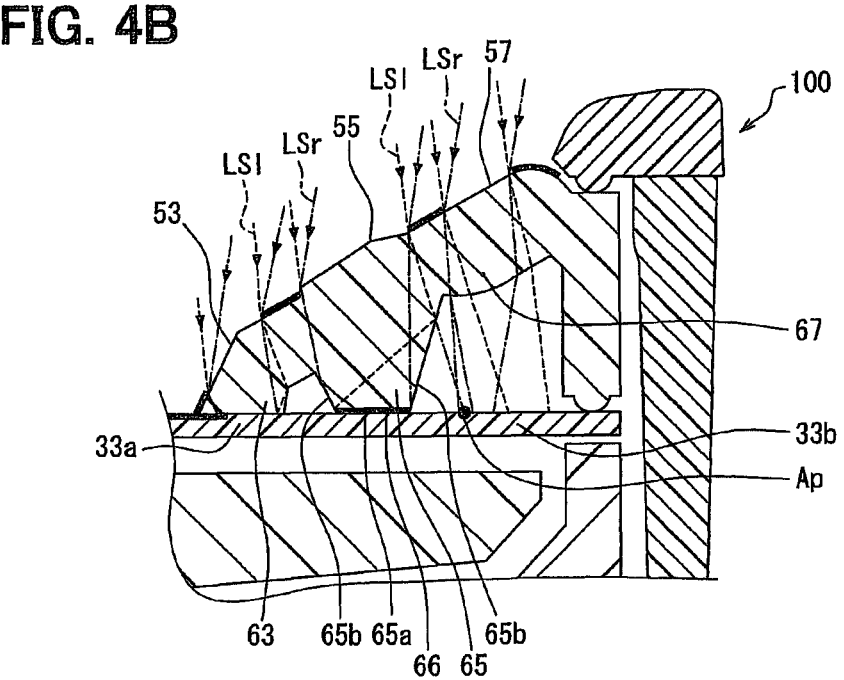
FIG. 4B is an enlarged cross-sectional view for explaining an effect of the solid scale ring according to the first embodiment.

In FIG. 4B, dashed lines LSl denote the line of sight of the left eye when the user's head moves to the leftmost position within the predetermined range. Further, one dashed-chain lines LSr denote the line of sight of the right eye when the user's head moves to the rightmost position within the predetermined range.

As shown in FIG. 4B, the line of sight entering the red belt portion 55 is reflected toward the red light incidence surface 65a on which the red printed portion 66 is formed due to the reflection surfaces 65b of the red light focusing portion 65.

If the outer reflection surface 65b is not formed, the line of sight LSl of the left eye entering the edge of the red belt portion 55 reaches the ring-shaped light transmitting portion 33b, which transmits the white bypassing light, as shown by a double-dashed chain line in FIG. 4B. In such a case, the user sees the white bypassing light transmitted from the ring-shaped light transmitting portion 33b through the red belt portion 55, which should emit the red light.

In order to restrict the white bypassing light from being seen through the red belt portion 55, it is considered to extend the red printed portion 66 in the radially outward direction up to the position Ap where the line of sight LSl of the left eye reaches. In such a case, further, if the ring-shaped light focusing portion 67 is not formed, the line of sight LSr of the right eye entering the inner edge of the ring-shaped light emitting portion 57 can reach the red printed portion 66 that is extended to the position Ap, as shown by a double-dashed chain line in FIG. 4B. In this case, the user can see the modulated red light transmitted from the red printed portion 66 through the ring-shaped light emitting portion 57, which should emit the white light.

The above-described phenomenon between the red belt portion 55 and the ring-shaped light emitting portion 57 will occur similarly between the red belt portion 55 and the white belt portion 53, as described hereinafter.

If the inner reflection surface 65b is not formed, the line of sight LSr of the right eye entering the inner edge of the red belt portion 55 can reach the belt-shaped light transmitting portion 33a that transmits the white bypassing light. In this case, the user sees the white bypassing light transmitted from the belt-shaped light transmitting portion 33a through the red belt portion 55, which should emit the red light.

In order to restrict the white bypassing light from being seen through the red belt portion 55, it is considered to extend the red printed portion 66 in the radially inward direction. In such a structure, further, if the white light focusing portion 63 is not formed, the line of sight LSl of the left eye entering the outer edge of the white belt portion 53 can reach the extended red printed portion 66. Thus, the user can see the modulated red light transmitted from the red printed portion 66 through the white belt portion 53, which should emit the white light.

In the present embodiment, on the other hand, even if the line of sight entering the red belt portion 55 is changed from the display direction, it is less likely that the modulated red light will be mixed with the white bypassing light to be emitted the white belt portion 53 and the ring-shaped light emitting portion 57 by the light focusing effect of the red light focusing portion 65.

Accordingly, it is less likely that the luminous color of the white belt portion 53 and the ring-shaped light emitting portion 57 will be affected by the modulated red light. Further, the red belt portion 55 emits the light having the predetermined red color by means of the modulated red light through the red light focusing portion 65.

Therefore, even if the red belt portion 55 and the white belt portion 53, and the red belt portion 55 and the ring-shaped light emitting portion 57 are disposed adjacent to each other, the white belt portion 53, the red belt portion 55 and the ring-shaped light emitting portion 57 can emit the lights in proper luminous states, respectively.

In such a case, flexibility in the shape and arrangement of each of the light emitting portions improve, contributing to enhance an appearance of the combination meter 100.

In addition, the white light focusing portion 63 conducts the bypassing light transmitted from the belt-shaped light emitting portion 33a toward the white belt portion 53 while focusing the bypassing light. The ring-shaped light focusing portion 67 conducts the bypassing light transmitted from the ring-shaped light transmitting portion 33b toward the ring-shaped light emitting portion 57 while focusing the bypassing light.

Therefore, even if the line of sight is changed from the display direction, it is less likely that the white bypassing light whose luminous color is not modulated by the red printed portion 66 will be mixed with the modulated red color, by the light focusing effect of the white light focusing portion 63 and the ring-shaped light emitting portion 67.

Accordingly, it is less likely that the color of light emitted from the red belt portion 55 will be affected by the white bypassing light. Likewise, it is less likely that the color of light emitted from the white belt portion 53 and the ring-shaped light emitting portion will be affected by the modulated red color.

Further, the modulated red light is reflected by the reflection surfaces 65b. Therefore, the modulated red light is properly focused on the red belt portion 55 without being mixed with the white light. As such, even if the line of sight is changed, it is less likely that the color of light emitted from the white belt portion 53 and the ring-shaped light emitting portion 57 will be affected by the modulated red light.

Moreover, the red printed portion 66 is integrated with the red light focusing portion 65. Therefore, the modulated light can be properly focused by the red light focusing portion 65 without causing leakage. Since the modulated light is properly focused by the red light focusing portion 65, it is less likely that the modulated red light will be mixed with the white bypassing light to be emitted from the white belt portion 53 and the ring-shaped light emitting portion 57. Accordingly, even if the line of sight of the user is changed, it is less likely that the color of light emitted from the white belt portion 53 and the ring-shaped light emitting portion 57 will be affected by the modulated red light.

By the color mixture restriction effect as described above, even if the red belt portion 55 and the white belt portion 53, and the red belt portion 55 and the ring-shaped light emitting portion 57 are disposed adjacent to each other, the white belt portion 53, the red belt portion 55 and the ring-shaped light emitting portion 57 can emit the lights in the proper luminous states, respectively.

Furthermore, the ring-shaped incidence surface 67a of the ring-shaped light focusing portion 67 refracts the line of sight of the user to the radially outward direction due to the convex lens effect. Therefore, the ring-shaped light emitting portion 33b for transmitting the white bypassing light can be formed on an extension of the refracted line of sight and at a location away from the red printed portion 66.

In such a case, therefore, the white bypassing light to be emitted from the ring-shaped light emitting portion 57 can properly bypass the red printed portion 66. By the refraction effect of the ring-shaped incidence surface 67a as described above, the red printed portion 66 and the ring-shaped light transmitting portion 33b can be located separate from each other irrespective of the distance between the red belt portion 55 and the ring-shaped light emitting portion 57.

Therefore, it is less likely that the lights having different colors will be mixed. Accordingly, the red belt portion 55 and the ring-shaped light emitting portion 57 can emit the lights in the proper luminous colors, respectively.

In addition, the red belt portion 55, the white belt portion 53 and the ring-shaped light emitting portion 57, which are disposed adjacent to the red belt portion 55, emit the lights having different colors, respectively. It is assumed that the modulated red color transmitted from the red printed portion 66 is mixed with the white bypassing light to be emitted from the white belt portion 53 and the ring-shaped light emitting portion 57. In such a situation, the user easily understands that the luminous color of the white belt portion 53 and the ring-shaped light emitting portion 57 are unexpectedly reddish, and thus the appearance of the combination meter 100 is degraded.

In the present embodiment, since the mixture of the modulated red color and the white bypassing color is restricted by the focusing effect of the red light focusing portion 65. Therefore, even if the line of sight of the user is changed, it is less likely that the luminous color of the white belt portion 53 and the ring-shaped light emitting portion 57 will be affected.

Accordingly, even if the red belt portion 55, the white belt portion 53 and the ring-shaped light emitting portion 57 are disposed adjacent to each other, the expected luminous states are maintained. Therefore, the appearance of the combination meter 100, which has the multiple light emitting portions that emit the lights in different colors, improves.

In the present embodiment, at least two of the main scale portion 51, the sub scale portion 52, the white belt portion 53, the red belt portion 55 and the ring-shaped light emitting portion 57 correspond to the multiple light emitting portions. For example, the red belt portion 55 corresponds to a first light emitting portion, and the white belt portion 53 and the ring-shaped light emitting portion 57 corresponds to a second light emitting portion. Also, the red printed portion 66 corresponds to a light modulating portion. The red light focusing portion 65 corresponds to a light focusing portion or a first light focusing portion. The reflection surfaces 65a correspond to a reflection surface, and the ring-shaped incidence surface 67a corresponds to a refraction surface. The white light focusing portion 63 and the ring-shaped light focusing portion 67 correspond, to a second light focusing portion. The light emitting diodes 83 correspond to a light source. The combination meter 100 is an example of the display device.

Second Embodiment

Figure 5:
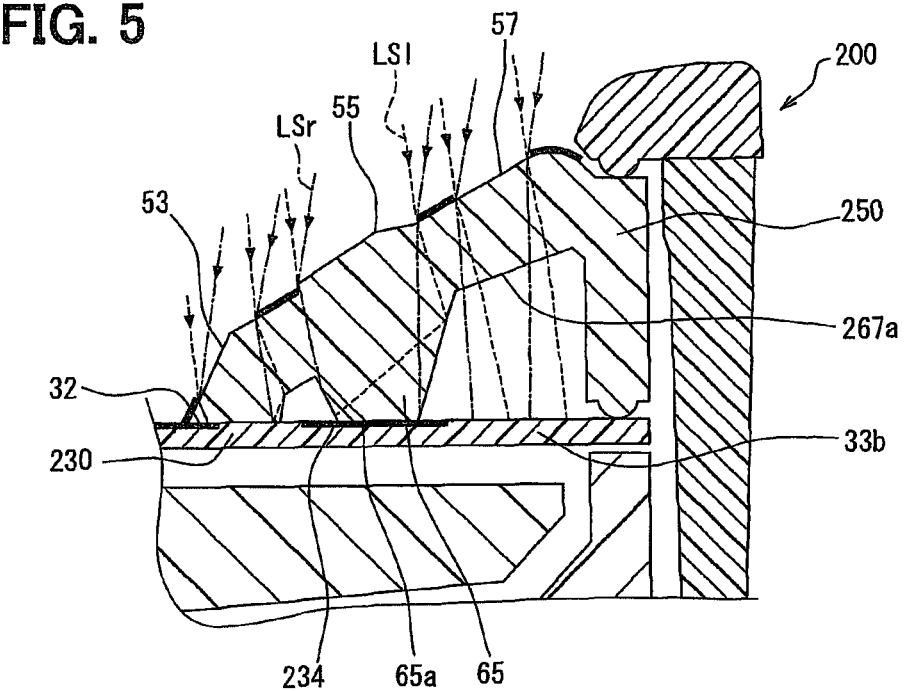
FIG. 5 is an enlarged cross-sectional view of a part of a combination meter according to a second embodiment.

A second embodiment will be described with reference to FIG. 5. The second embodiment is a modification of the first embodiment. FIG. 5 is an enlarged cross-sectional view of a part of a combination meter 200 according to the second embodiment.

The combination meter 200 has a solid scale ring 250 and a display panel 230, in place of the solid scale ring 50 and the display panel 30 of the first embodiment. Other structures of the combination meter 200 are similar to those of the combination meter 100 of the first embodiment.

The solid scale ring 250 does not have a structure corresponding to the ring-shaped light focusing portion 67 for focusing the white bypassing light on the ring-shaped light emitting portion 57. Instead, the solid scale ring 250 has a ring-shaped incidence surface 267a having a flat shape. The ring-shaped incidence surface 267a allows the white bypassing light transmitted from the ring-shaped light transmitting portion 33b to enter the solid scale ring 250.

In addition, a structure corresponding to the red printed portion 66 of the first embodiment is not formed on the red light incidence surface 65a. In place of the red printed portion 66 on the red light incidence surface 65a, the display panel 230 has a red printed portion 234 on the front surface.

The red printed portion 234 mainly transmits rays of light in a wavelength range of red, similar to the red printed portion 66. Therefore, the red printed portion 234 modulates the color of light emitted from the light emitting diodes 83 into a predetermined red color as the luminous color of the red belt portion 55, and allows the modulated light to enter the red light incidence surface 65a.

Further, the red printed portion 234 is formed in a contact portion where the display panel 230 contacts the red light incidence surface 65a of the solid scale ring 250 and a portion surrounding the contact portion. Therefore, even if a relative position between the solid scale ring 250 and the display panel 230 is displaced due to manufacturing tolerance, the modulated red light, which has been modulated in the red color through the red, printed portion 234, properly enters the red light incidence surface 65a.

The solid scale ring 250 has the red light focusing portion 65 serving to condense the modulated red light. Therefore, even if the line of sight of the user entering the red belt portion 55 is changed, it is less likely that the modulated red light will be mixed with the white bypassing light to be emitted from the white belt portion 53 and the ring-shaped light emitting portion 57, as shown by the lines LSl, LSr in FIG. 5.

As described above, even if the solid scale ring 250 does not have the structure corresponding to the ring-shaped right focusing portion 67 of the first embodiment, it is less likely that the luminous color of the ring-shaped light emitting portion 57 will be affected by the modulated red color.

Also in the case where the red printed portion 234 is formed on the display panel 230, in place of the solid scale ring 250, the modulated red light can enter the red light focusing portion 65. Therefore, the red belt portion 55 can emit the light in the proper red color by means of the modulated red color focused through the red light focusing portion 65. As such, even if the red belt portion 55, the white belt portion 53 and the ring-shaped light emitting portion 57 are disposed adjacent to each other, the red belt portion 55, the white belt portion 53 and the ring-shaped light emitting portion 57 can emit the lights in the proper colors, respectively.

Since the red printed portion 234 is formed on the front surface of the display pane 230, the manufacturing costs reduce. Specifically, since the solid scale ring 250 does not have the structure corresponding to the red printed portion 66, the manufacturing cost of the solid scale ring 250 reduces.

The red printed portion 234 is formed on the front surface of the display panel 230 in the same step as forming the light shielding portion 32. For example, the cost necessary for adding the red printed portion 234 on the display panel 230 is smaller than the cost that can be saved by eliminating the red printed portion from the solid scale ring 250. Therefore, since the red printed portion 234 is formed on the display panel 230, the manufacturing costs of the combination meter 200 reduce. Also, the red belt portion 55 can properly emit the light in the red color.

In the second embodiment, the red printed portion 234 corresponds to the light modulating portion, and the combination meter 200 corresponds to the display device.

Third Embodiment

Figure 6:
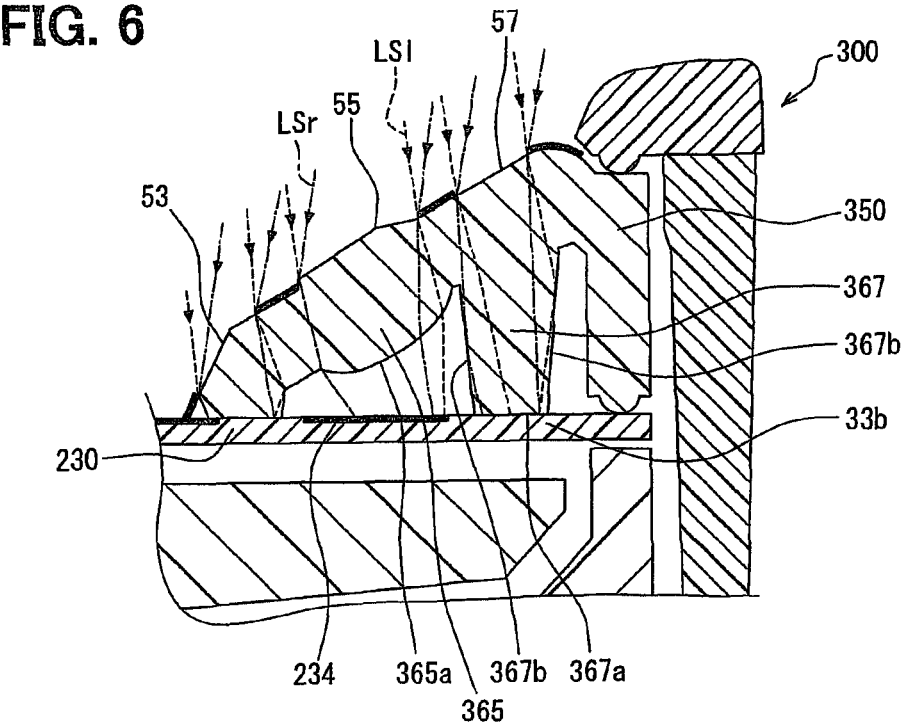
FIG. 6 is an enlarged cross-sectional view of a part of a combination meter according to a third embodiment.

A third embodiment will be described with reference to FIG. 6. The third embodiment is a modification of the second embodiment. FIG. 6 is an enlarged cross-sectional view of a part of a combination meter 300 according to the third embodiment.

The combination meter 300 has a solid scale ring 350, in place of the solid scale ring 250 of the second embodiment. Other structures of the combination meter 300 are similar to those of the combination meter 200 of the second embodiment.

The solid scale ring 350 has a red light focusing portion 365 and a ring-shaped light focusing portion 367. The red light focusing portion 365 is formed on a side opposite to the red belt portion 55 in the solid scale ring 350 with respect to the display direction. The red light focusing portion 365 conducts the modulated red light to the red belt portion 55.

The red light focusing portion 365 has a red light incidence surface 365a that allows the light to be emitted from the red belt portion 55 to enter the solid scale ring 350. The red light incidence surface 365a is curved into a convex shape in a direction opposite to the display direction. That is, the red light incidence surface 365a is formed into a convex lens shape. The optical axis of the red light incidence surface 365a is inclined radially inward with respect to the display direction. Therefore, the lines of sight LSl, LSr of the user are refracted toward the red printed portion 234 by the red light incidence surface 365a.

As such, the modulated red light transmitted from the red printed portion 234 enters the red light focusing portion 365 through the red light incidence surface 365a. The modulated red light is refracted toward the red belt portion 55 by the red light incidence surface 65a having the convex lens shape. Therefore, in the red light focusing portion 365, the modulated red light is focused on the red belt portion 55.

The ring-shaped light focusing portion 367 is formed on a side opposite to the ring-shaped light emitting portion 57 in the solid scale ring 350 with respect to the display direction. The ring-shaped light focusing portion 367 conducts the white bypassing light to the ring-shaped light emitting portion 57.

The ring-shaped light focusing portion 367 projects from the solid scale ring 350 in the direction opposite to the display direction, that is, toward the display panel 230. The ring-shaped light focusing portion 367 has a ring-shaped incidence surface 367a and a pair of reflection surfaces 367b. The ring-shaped incidence surface 367a allows the light to be emitted from the ring-shaped light emitting portion 57 to enter the solid scale ring 350.

The ring-shaped incidence surface 367a is formed at an end surface of the ring-shaped light focusing portion 367, the end being adjacent to the display panel 230. The ring-shaped incidence surface 367a is a plane surface and disposed along the front surface of the display panel 230. The ring-shaped incidence surface 367a is in contact with the ring-shaped light transmitting portion 33b.

The reflection surfaces 367b are opposed to each other with respect to the radial direction of the solid scale ring 350. Each of the reflection surfaces 367b extends in an annular shape along the circumference of the solid scale ring 350.

An inner reflection surface 367b, which is one of the reflection surfaces 367b and located on a radially inner side of the other, is inclined radially inside with respect to the display direction. An outer reflection surface 367b, which is the other of the reflections surfaces 367b and located on a radially outer side of the inner reflection surface 367b, is inclined radially outward with respect to the display direction.

The white bypassing light transmitted from the ring-shaped light transmitting portion 33b enters the ring-shaped incidence surface 367a. In the ring-shaped light focusing portion 367, the bypassing light is reflected toward the ring-shaped light emitting portion 57 by the reflection surfaces 367b. Thus, the bypassing light is focused on the ring-shaped light emitting portion 57.

In the third embodiment, the red light focusing portion 365 has a light focusing function by the red light incidence surface 365a having the convex lens shape. Therefore, the even if the line of sight of the user entering the red belt portion 55 is changed, it is less likely that the modulated red light will be mixed with the white bypassing light to be emitted from the white belt portion 53 and the ring-shaped light emitting portion 57.

As described above, even if the red light incidence surface 365a is formed into the convex lens shape, it is less likely that the luminous color of the ring-shaped light emitting portion 57 will be affected by the modulated red light.

In addition, the red belt portion 55 can emit the light in the red color by means of the modulated red color focused by the red light focusing portion 365. Therefore, even if the red belt portion 55 and the white belt portion 53, and the red belt portion 55 and the ring-shaped light emitting portion 57 are disposed adjacent to each other, the white belt portion 53, the red belt portion 55 and the ring-shaped light emitting portion 57 can emit the light in the proper luminous colors, respectively.

In addition, the ring-shaped light focusing portion 367 conducts the bypassing light transmitted from the ring-shaped light transmitting portion 33b to the ring-shaped light emitting portion 57 while focusing the bypassing light by the reflection surfaces 367b. In this way, the ring-shaped light focusing portion 367 exerts the light focusing function by the reflection surface 367b. Therefore, even if the line of sight of the user is changed, it is less likely that the white bypassing light whose color is not modulated will be mixed with the modulated red color.

Accordingly, it is less likely that the luminous color of the red belt portion 55 will be affected by the white bypassing light. Also, it is less likely that the luminous color of the ring-shaped light emitting portion 57 will be affected by the modulated red light.

Further, the modulated red light is properly focused on the red belt portion 55 without being mixed with the white bypassing light, by the light focusing function of the red light incidence surface 365a. Therefore, even if the line of sight of the user is changed, it is less likely that the luminous color of the white belt portion 53 and the ring-shaped light emitting portion 57 will be affected by the modulated red light.

In addition, the lines of sight LSl, LSr entering the red belt portion 55 are properly directed to the red printed portion 234, which is located away from the ring-shaped light transmitting portion 33b, due to the refraction effect of the red light incidence surface 365a having the convex lens shape. Therefore, even if the red printed portion 234 is separated from the ring-shaped light transmitting portion 33b, the red printed portion 234 exerts the function of modulating the color of light to be emitted from the red belt portion 55.

Moreover, since the red printed portion 234 is away from the ring-shaped light transmitting portion 33b, it is less likely that the modulated light will enter the ring-shaped incidence surface 367a. Therefore, even if the line of sight of the user is changed, it is less likely that the luminous color of the ring-shaped light emitting portion 57 will be affected by the modulated red light.

By the color mixture restriction effect as described above, even if the red belt portion 55 and the white belt portion 53, and the red belt portion 55 and the ring-shaped light emitting portion 57 are disposed adjacent to each other, the white belt portion 53, the red belt portion 55 and the ring-shaped light emitting portion 57 emit the lights in the proper luminous states, respectively.

In the third embodiment, the red light incidence surface 365 corresponds to the light focusing portion or the first light focusing portion. The red light incidence surface 365a corresponds to the refraction surface. The ring-shaped light emitting portion 367 corresponds to the second light focusing portion. The reflection surfaces 367b correspond to the reflection surface. The combination meter 300 corresponds to the display device.

Other Embodiments

Various exemplary embodiments are described hereinabove. However, the present invention is not limited to the above described exemplary embodiments, but may be implemented in various other ways without departing from the spirit of the invention. Also the present invention may be implemented by combining the above described embodiments in various other ways.

In the first and second embodiment, the red light focusing portion 65 has the reflection surfaces 65b for focusing the modulated light on the red belt portion 55. In the third embodiment, the red light focusing portion 365 has the red light incidence surface 365a as the refraction surface. Alternatively, the light focusing portion may be configured to focus the modulated red light on the red belt portion by any structure other than the reflection surface and the refraction surface or by a structure provided by a combination of the refraction surface and the refraction surface.

In the above described embodiments, the white light focusing portion and the ring-shaped light focusing portion are provided as the second light focusing portion. Alternatively, the structure corresponding to the second light focusing portion for focusing the bypassing light may be eliminated as long as the bypassing light whose luminous state is not modulated is not easily emitted from the red belt portion.

In the first embodiment, the ring-shaped incidence surface 67a has the convex lens shape, as the refraction surface. Also, in the third embodiment, the red light focusing portion 365 has the convex lens shape, as the refraction surface. However, it is not always necessary that the incidence surface having the convex lens shape as the refraction surface is formed on the light focusing portion. For example, all the light focusing portions have a structure of focusing the light by the reflection surface.

In the first embodiment, the red printed portion is provided to modulate the color of light into the red color as the light modulating portion. However, the color of the light modulated in the light modulating portion is not limited to red. For example, the light modulating portion may be configured to modulate the color of the light emitted from the light emitting diode into any other color, such as green or yellow. As another example, the light modulating portion may be configured to modulate a brightness of the light as the luminous state, in place of modulating the color. That is, the luminous state modulated by the light modulating portion is not limited to the color. For example, small projections and grooves may be formed on the back surface of the light conduction member 70 as the light modulating portion that increases the brightness of the light entering the first light focusing portion. The light modulating portion may be formed on the display panel and/or the solid scale ring.

In the first embodiment, the light whose luminous state is not modulated by the red printed portion as the light modulating portion is introduced to the white light focusing portion and the ring-shaped light focusing portion while maintaining its luminous state as being emitted from the light emitting diode. Alternatively, the bypassing light may be emitted from the white belt portion and the ring-shaped light emitting portion as the second light emitting portion after the luminous state such as the brightness and/or hue is modulated.

In the above embodiment, the display device is exemplary employed to the tachometer of the combination meter to restrict the mixture of the color of light emitted from the light emitting portion of the red zone. However, the present invention may be employed to any other display devices having the light emitting portions with different luminous states, such as a speedometer, a fuel gauge or a water temperature gauge.

Additional advantages and modifications will readily occur to those skilled in the art. The invention in its broader term is therefore not limited to the specific details, representative apparatus, and illustrative examples shown and described.

What is claimed is:

1. A display device for displaying information in a display area, the display device comprising:
    a light source;
    a first light emitting portion disposed in the display area and emitting a light that is provided by the light source and has a first luminous state;
    a second light emitting portion disposed next to the first light emitting portion in the display area and emitting a light that is provided by the light source and has a second luminous state different from the first luminous state;
    a light modulating portion modulating a state of a light generated from the light source into the first luminous state;
    a light focusing portion focusing a modulated light modulated into the first luminous state by the light modulating portion on the first light emitting portion; and
    a display panel including a first light transmitting portion and a second light transmitting portion, the first light transmitting portion transmitting the light that is provided by the light source to the light modulating portion, the second light transmitting portion transmitting the light that is provided by the light source and bypasses the light modulating portion, wherein
    the first light emitting portion, the second light emitting portion, and the light focusing portion are provided by a single member that is disposed along the display panel,
    the second light emitting portion emits the light that has been transmitted through the second light transmitting portion, and
    the first light emitting portion emits the light that has been transmitted through the first light transmitting portion, the light modulating portion and the light focusing portion.

2. The display device according to claim 1, wherein the light focusing portion has a reflection surface configured to reflect the modulated light toward the first light emitting portion, thereby to focus the modulated light on the first light emitting portion.

3. The display device according to claim 1, wherein the light focusing portion has a refraction surface configured to refract the modulated light toward the first light emitting portion, thereby to focus the modulated light on the first light emitting portion.

4. The display device according to claim 1, wherein the light modulating portion is integral with the light focusing portion.

5. The display device according to claim 1, wherein the light focusing portion is a first light focusing portion, the display device further comprising a second light focusing portion, wherein the second light focusing portion focuses a bypassing light that is a part of the light generated from the light source and bypasses the light modulating portion on the second light emitting portion.

6. The display device according to claim 5, wherein at least one of the first light focusing portion and the second light focusing portion has a refraction surface that refracts corresponding one of the modulated light and the bypassing light to the corresponding light emitting portion, thereby to focus the corresponding light on the corresponding light emitting portion.

7. The display device according to claim 1, wherein
the first luminous state and the second luminous state include different colors, and
the light modulating portion adjusts a color of the light generated from the light source into a predetermined color as the first luminous state.

* * * * *